United States Patent

[11] 3,618,837

| [72] | Inventor | Jan W. Jacobsen<br>Copenhagen, Denmark |
|------|----------|----------------------------------------|
| [21] | Appl. No. | 888,997 |
| [22] | Filed | Dec. 29, 1969 |
| [45] | Patented | Nov. 9, 1971 |
| [73] | Assignee | Multiscreen Corporation Limited |

[54] FILM TRANSPORT MECHANISM
13 Claims, 9 Drawing Figs.

[52] U.S. Cl. ............................................. 226/57, 226/63
[51] Int. Cl. ............................................. G03b 1/22
[50] Field of Search ................................. 226/54, 57, 63, 64, 65, 66, 70; 352/194

[56] References Cited
UNITED STATES PATENTS
| 2,136,930 | 11/1938 | Albrecht et al. | 226/63 |
| 2,719,455 | 10/1955 | Mitchell | 226/63 |
| 2,986,316 | 5/1961 | Petersen | 226/57 |

*Primary Examiner*—Allen N. Knowles
*Attorney*—Rogers, Bereskin & Parr

ABSTRACT: A film transport mechanism for moving a film through a motion picture camera or the like. The mechanism has a pair of claw arms pivotally and slidably mounted on a common axis. The arms are respectively driven in an arc about the axis by constant diameter cams which rotate at constant speed and move the claw arms back and forth through half a film frame length. Each claw arm has a claw at its distal end for engaging film perforations. The cams are attached to a common shaft and they impart motion to the arms such that the arms never move in the same direction. A cam wheel rotates about the axis and combines with followers attached to the arms to reciprocate the claws into and out of engagement with the film at predetermined points in a cycle, the predetermined points being fixed in relation to the angular positions of the cams relative to an arbitrary datum.

INVENTOR.
JAN W. JACOBSEN
BY
Rogers, Bereskin, & Parr

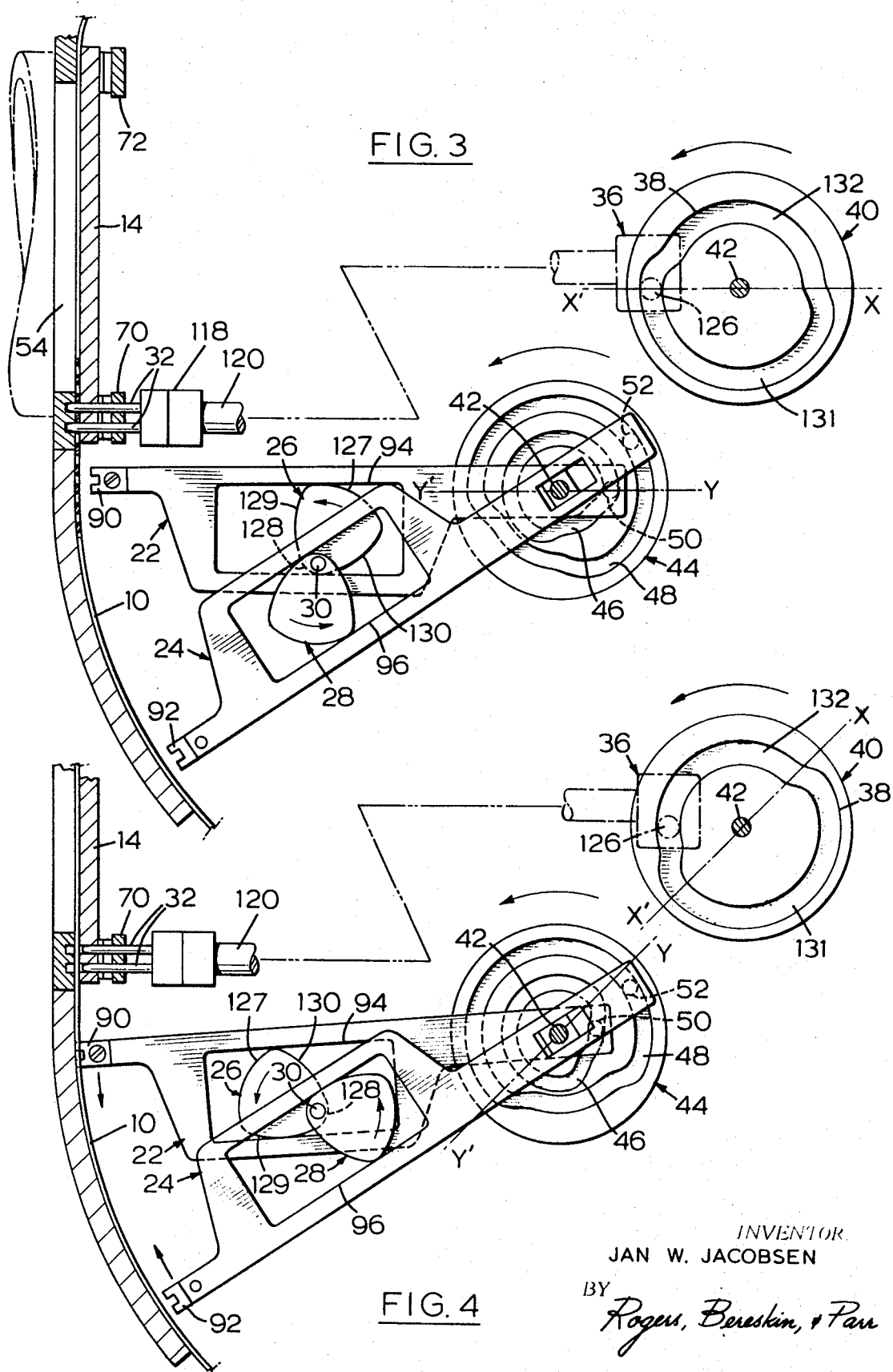

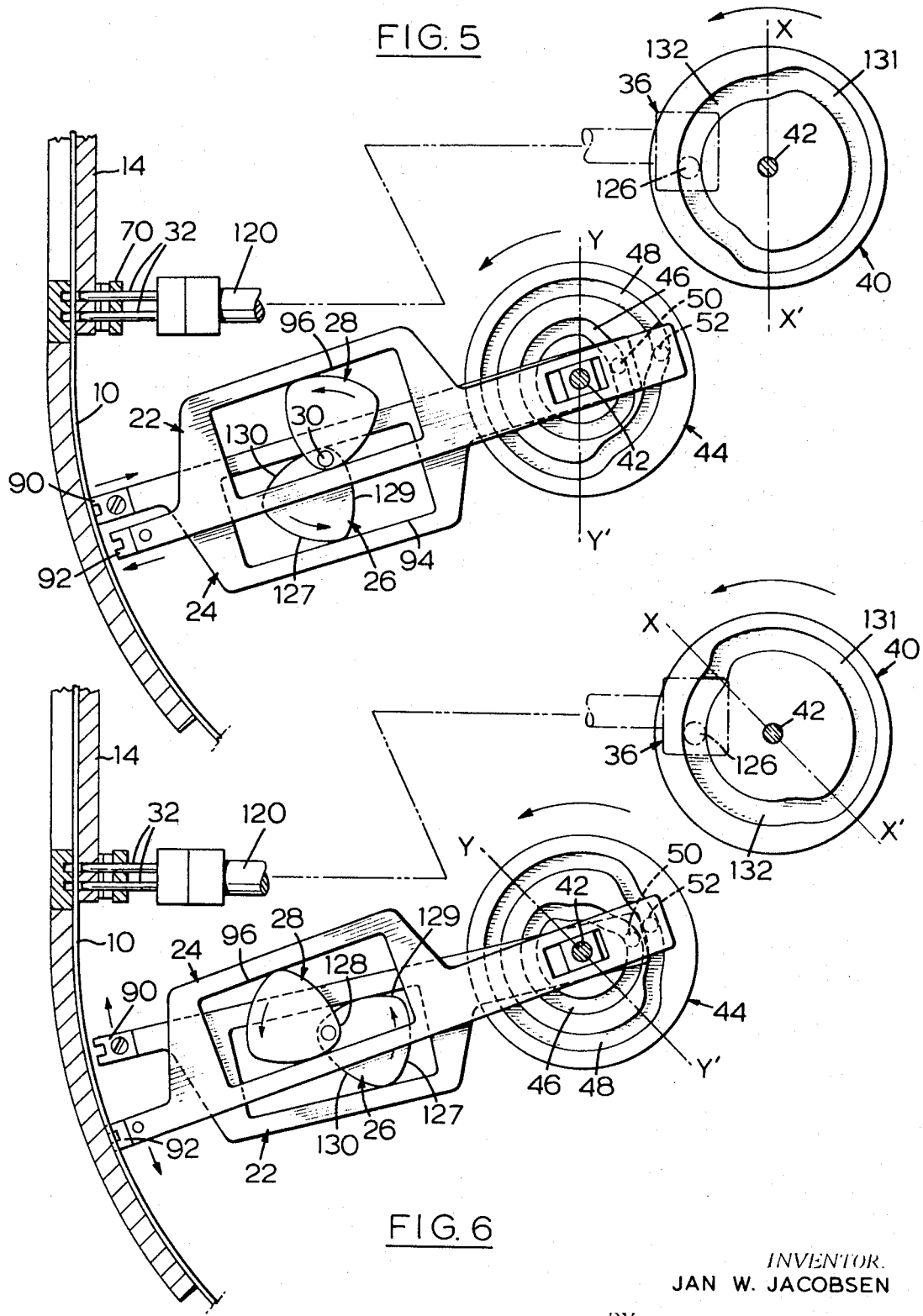

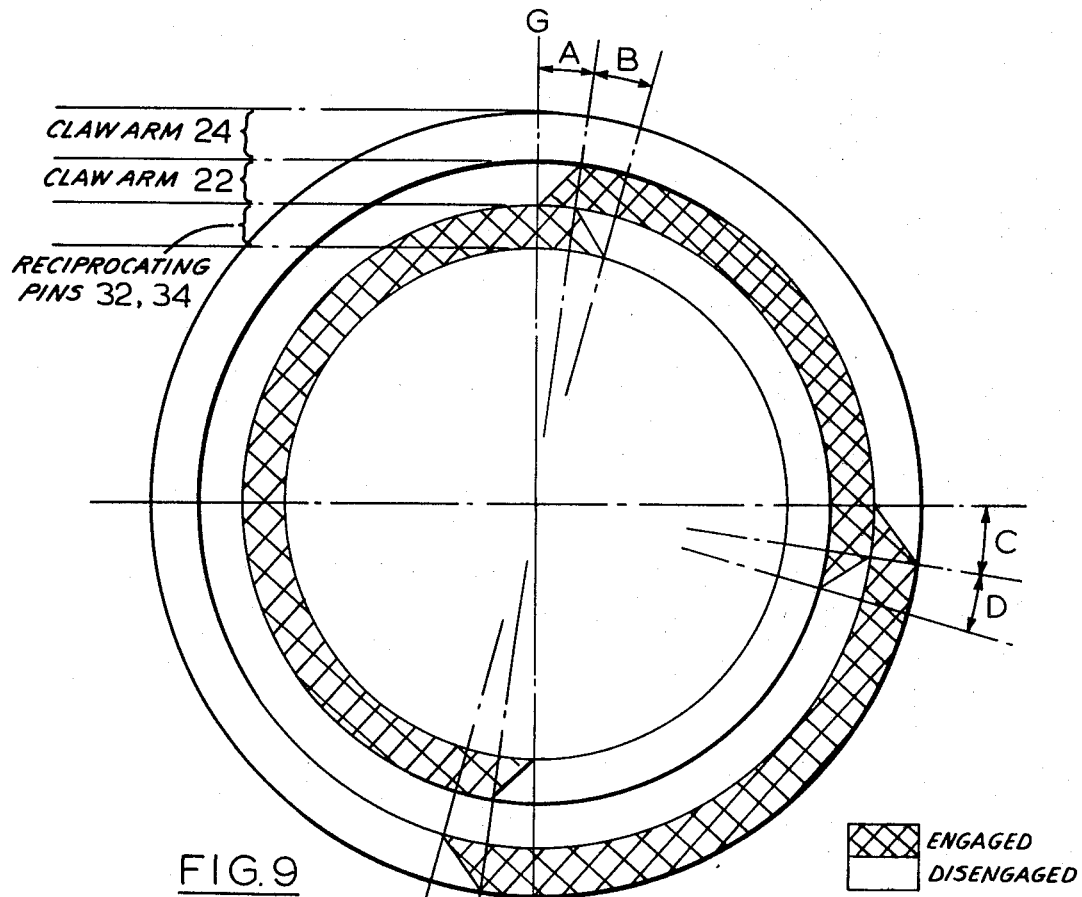
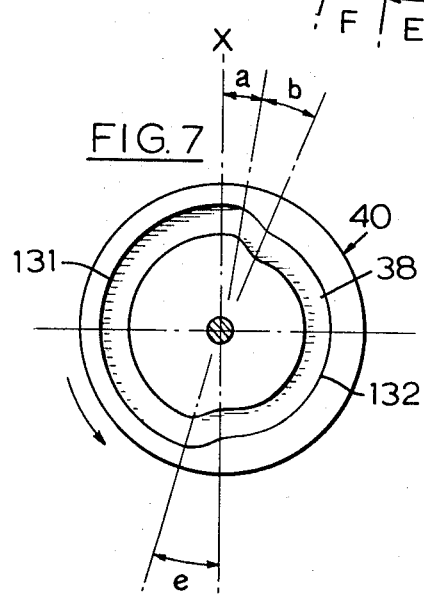
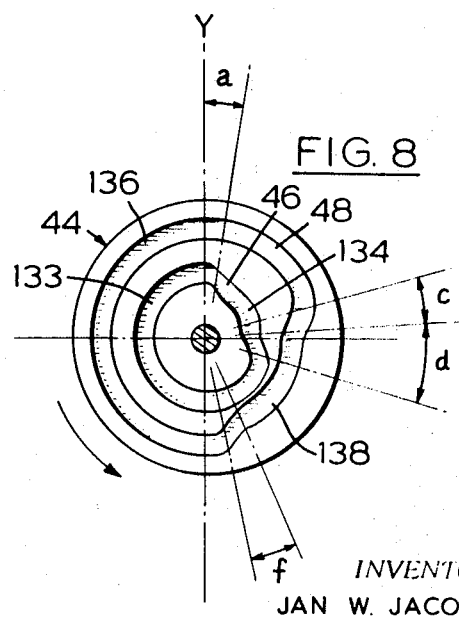

FILM TRANSPORT MECHANISM

This invention relates to a film transport mechanism for moving a film through a motion picture camera or other motion picture device such as a projector.

A motion picture camera must transport the film intermittently and expose each frame of the film for a fraction of a second. In professional cameras, film is commonly transported through at a speed of 24 frames per second so that each frame must be exposed and then moved one frame length in a total time of one twenty-fourth of a second. Consequently since exposure may take up half of the one twenty-fourth second available, the mechanism must engage the film, move it one frame length, and disengage the film in a maximum time of about one forty-eighth of a second. If the engagement is not carried out smoothly the film may be damaged. This problem is particularly important in larger films such as 70 mm. film.

Film transport mechanisms have been developed which emplov two arms each of which has a claw at its distal end adapted to engage the perforations in a film. In one type of mechanism the arms are driven in an arc by a single cam while an eccentric or some other device reciprocates the arms into and out of engagement with the film. The resulting motion of the claws is often complex since the claws move through relatively long paths compared with the short distance moved by the film during each cycle. The arms are arranged to move in sequence so that the film is moved one-half of a frame length by one arm and then moved a similar distance by the other arm. During certain parts of the cycle the claws are moving in the same direction thereby creating relatively large out-of-balance vibration forces.

In another type of mechanism each of the arms is driven by a single constant diameter cam which cooperates with a specially formed aperture in the arm. As in the previous example, the path followed by the claws is long in comparison with the distance moved by the film, and the arms move in the same direction during parts of their cycles. Prior mechanisms of the kind discussed above are described in U.S. Pat. Nos. 2,719,455 to Mitchell and 2,136,930 to Albrecht et al.

According to the present invention, a film transport mechanism is provided which includes a pair of claw arms pivotably and slidably mounted on a common axis. The arms are respectively driven in an arc about the axis by constant diameter cams which rotate at constant speed and move the claw arms back and forth through half a film frame length. Each claw arm has a claw at its distal end for engaging film perforations. The cams are attached to a common shaft and they impart motion to the arms such that the arms never move in the same direction. A cam wheel rotates about the axis and combines with followers attached to the arms to reciprocate the claws into and out of engagement with the film at predetermined points in a cycle, the predetermined points being fixed in relation to the angular positions of the cams relative to an arbitrary datum.

In drawings which illustrate a preferred embodiment of the invention:

FIGS. 3 to 6 are diagrammatic plan views of the transport mechanism showing different positions of the parts during a cycle of operation;

FIGS. 7 and 8 show two cams which form part of the mechanism; and

FIG. 9 is a typical time cycle showing a sequence of movements of the mechanism in advancing the film through one frame length.

Figure 1:
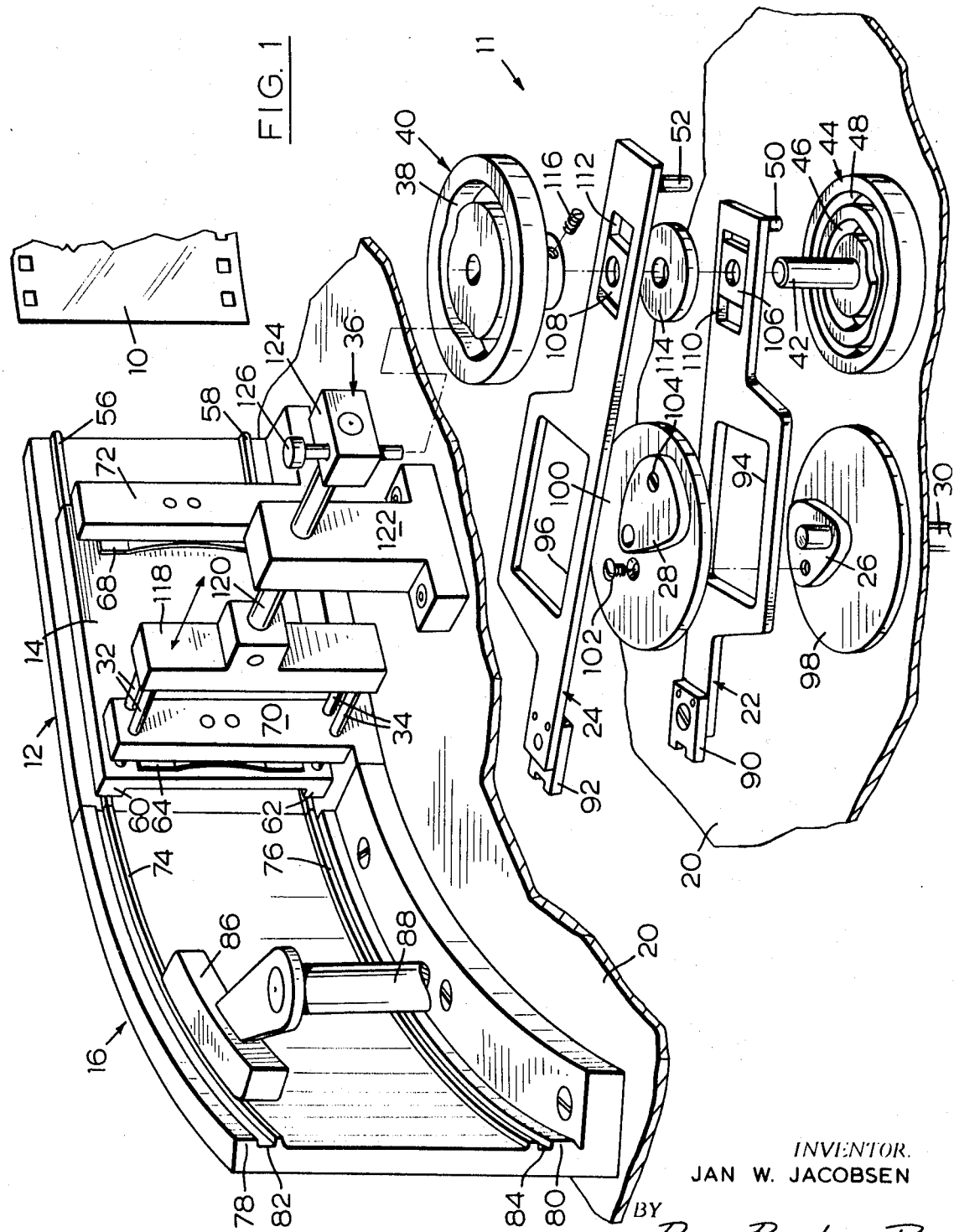
FIG. 1 is a partially exploded perspective view of a transport mechanism according to the invention.

In FIG. 1, film 10 is intermittently moved through a camera (or other cinematographic device) by a transport mechanism 11. During each exposure, the frame of the film to be exposed is held in place between a straight guide 12 and a spring-loaded retaining plate 14, and after exposure the film moves along a curved guide 16. The guides 12 and 16 are attached to a baseplate 20 which also supports the transport mechanism 11. The baseplate 20 is shown broken away in FIG. 1 to illustrate the parts more clearly. The transport mechanism 11 includes claw arms 22 and 24 which respectively are driven by constant diameter cams 26 and 28 and each of the cams 26, 28 is rigidly attached to a cam shaft 30. During exposure, the film is located by reciprocating pins 32 and 34 which pass through the retaining plate 14 and which are driven by a retractable cam follower 36 riding in a cam groove 28 in a cam wheel 40. The cam wheel 40 is attached to a spindle 42 which also drives a second cam wheel 44 having grooves 46 and 48 for combining with cam followers 50 and 52 respectively on the claw arms 22, 24. The wheel 44 reciprocates the claw arms into and out of engagement with the film 10.

The straight film guide 12 includes an aperture 54 (FIG. 3) for exposing the film, and on the side of the guide 12 facing the retaining plate 14 a pair of spaced-apart parallel ridges 56 and 58 form a track for the film 10 as the film passes the aperture 54. The retaining plate 14 also has a pair of parallel ridges 60 and 62 in registration with the ridges 56 and 58 respectively for applying pressure to the film to hold the film during exposure. The retaining plate 14 is slidably mounted on the reciprocating pins 32 and 34 and is biased toward the straight guide 12 by leaf springs 64 and 68 which are attached to pillars 70 and 72 respectively. The pillars 70, 72 are integrally connected to the straight guide 12. One end of each of the ridges 56 and 58 on the straight guide 12 is in registration with a corresponding one of a pair of inner ridges 74, 76 on the curved guide 16, and a pair of outer ridges 78 and 80 in the curved guide 16 also support the film as it passes around the curved guide 16. The inner ridge 74 and outer ridge 78 define a groove 82 and the ridges 76 and 80 define a similar groove 84. The purpose of these grooves will be described later. A spring-loaded pressure shoe 86 is mounted on a spindle 88 to hold the film in engagement with the curved plate 16.

The cams 26 and 28 are positioned in rectangular apertures 94, 96 in the arms 22, 24 respectively to drive the arms 22 and 24 in a sweeping motion such that each of the arms transports the film through half a frame length (the shape of the cams will be described later). Each claw arm 22, 24 includes a claw 90, 92 respectively which is moved into and out of engagement with the film 10 as the followers 50, 52 are moved by the cam wheel 44. The claws 90, 92 are attached to the arms 20, 24 respectively so that each of the claws moves in the groove 82 when the claws are engaged in the film 10. The claw arm 24 is a mirror image of the arm 22 so that the arm 22 sweeps a half of the curved guide 16 nearer the straight guide 12 and the arm 24 sweeps the other half of the guide 26.

When assembled, the arm 22 is guided between a pair of circular discs 98 and 100 with the cam 26 positioned in the rectangular opening 94. The disc 100, and cam 26 are held in place relative to the disc 98 by a fitted screw 102 and the cam shaft 30. The cam shaft 30 and a further fitted screw 104 hold the cam 28 in position on the disc 100, and when the arm 24 is in place, the cam 28 is positioned in the rectangular opening 96 in the arm 24. The arms 22, 24 are guided in their movement by sliders 106 and 108 which are rotatably mounted on the spindle 42 and which slide in rectangular openings 110 and 112 in the arms 22 and 24 respectively. The sliders 106, 108 are spaced apart by a washer 114 which is substantially the same thickness as the disc 100.

The second cam wheel 44 is attached to the spindle 42 and when the arms 22 and 24 are in place on the cams 26, 28 the pin 50 on the arm 22 is located in the cam groove 46, and the pin 52 on the arm 24 is located in the cam groove 48. As the cam wheel 44 rotates with the spindle 42, the cam grooves 46 and 48 cause the arms 22, 24 to reciprocate on the sliders 106, 108 respectively. This action will be further explained later. The cam wheel 40 is held in place on the spindle 42 by a grub screw 116 and the wheel 40 serves to hold the arm 24 in registration on the cam 28. The cam wheel 40 drives the reciprocating pins 32, 34 which locate the film 19 during exposure. The pins 32, 34 are rigidly attached to one side of a crossbar 118 which is in turn attached at the center of its opposite side to a rod 120. The rod is slidably supported in a pedestal 122 and at its distal end the rod has the cam follower 36 attached to it. The follower 36 comprises a block 124 which is rigidly attached to the rod 120, and a spring-loaded plunger 126 which normally engages in the cam groove 38 in the cam wheel 40. The plunger can be lifted out of engagement with the cam groove 38 to withdraw rod 120 and the pins 32, 34 when the film is being loaded manually between the straight guide 12 and the retaining plate 14. As the cam wheel 40 rotates with the spindle 42, the cam follower 36 is made to reciprocate so that the pins 32, 34 reciprocate into and out of engagement with the film 10 at predetermined intervals.

Although FIG. 1 illustrates a machine having only one film transport mechanism 11, a second mechanism similar to the first mechanism 11 can be attached to an extended camshaft 30 so that the second mechanism operates on the film in the groove 82. This may require some modification to the pressure shoe 86 to give clearance for the second set of claw arms.

Figure 2:
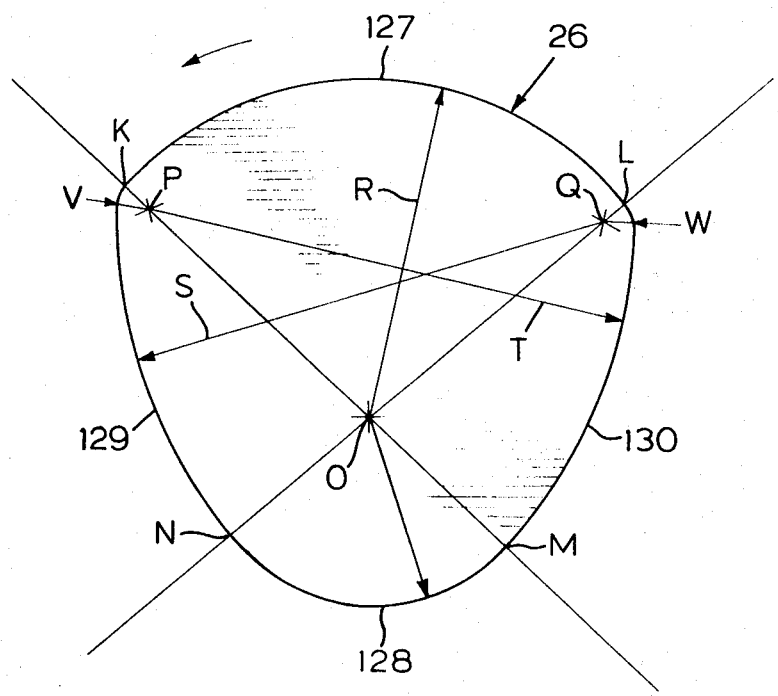
FIG. 2 shows the shape of a typical constant diameter cam.

The shape of the constant diameter cams 26, 28 will next be described with exemplary reference to the cam 26. As seen in FIG. 2, the periphery of the cam consists of two dwell surfaces 127, 128 extending between points KL and MN respectively and two stroke surfaces 129, 130 extending between KN and LM respectively. The equal angles KON and LOM are known as the stroke angles and equal angles KOL and NOM are known as the dwell angles. The cam rotate anticlockwise as drawn so that surface 129 is the leading stroke surface and 130 is the trailing stroke surface. The cam has a constant diameter; and the curved surfaces forming its periphery have radii which are related such that $S+W=T+V=R+U$. Any pair of adjacent surfaces such as 127 and 130 must occupy 180° of the cam, taking 'O' the axis of the camshaft as the center, although the angle between the lines LN and KM may be varied. In a typical cam, the period during which the film is transported (i.e. the film transport stroke of the arm) is made equal to the dwell period during which the arm does not rotate. Since the arm rotates through a given angle $\theta$ while the leading stroke surface moves the arm through a film transport stroke, the period of the stroke is proportional to the stroke angle $KON+\theta$. Also, the dwell period is proportional to the dwell angle NOM, and since the proportionalities both vary with the speed of the cam, then stroke angle $KON+\theta=$ dwell angle NOM for equal periods of film transport stroke and dwell. The return stroke will be proportional to angle $KON-\theta$ (since the arm is rotating in the opposite direction) so that the arm returns in a shorter period than the period of the film transport stroke. Also the stroke angle + dwell angle = 180° so that the stroke angle $KON=(90-\theta/2)$ and the dwell angle $NOM=(90b+\theta/2)$.

When the dwell surfaces 127, 128 are in contact with the sides of one of the apertures 94, (FIG. 1) in the claw arm 22 (for example) the cam may rotate without moving the arm. This position is shown in FIG. 3. However as soon as the point N comes into contact with a side of the aperture, the claw arm begins to move under the influence of the leading stroke surface 129 as shown in FIG. 4. The arm will continue to move until the dwell surfaces are again in contact with the sides of the aperture (FIG. 5) and then the arm will remain stationary until the leading stroke surface 129 moves the arm back to the FIG. 3 position.

The angular relationship between the cams 26 and 28 is controlled by the total angle through which the arms rotate in moving the film through one frame and the desired movement of the arms 22, 24 relative to each other. The arms are preferably arranged so that they rotate in opposition to reduce vibration forces. In a cycle of 360° one arm is therefore 180° out of phase with the other arm. Since the stroke angle described by the leading stroke face 129 about the center 'O' occupies $(90-\theta/2)$ degrees of the cam relative to the center 'O', the cam would rotate through $(90-\theta/2)$ degrees in imparting linear motion to a follower between N and K before the dwell surface 127 engaged the follower. However the arm in this case is not moving linearly but is rotating about the axis spindle 42 (FIG. 1) so that the cam rotates through an angle of $\theta$ degrees while the leading stroke surface 129 is in contact with the follower. Consequently since the arm and cam are rotating in the same direction the cam rotates $(90-\theta/2+\theta)= (90+\theta/2)$ degrees during the downward stroke (as shown in FIG. 3).

A complete cycle thus includes the steps of, (a) rotating the cam through $(90-\theta/2)$ degrees to move the arm 22 and hence the film through half a frame length; (b) rotating the cams through $(90+\theta/2)$ degrees of dwell and (c) rotating the cam 28 through $(90+\theta/2)$ degrees to move the arm 24 and hence the film through a second half of the frame length. Consequently the point N on the cam 26 must precede the corresponding point on the cam 28 by $(90+\theta/2)$, to move the arm 22, plus $(90+\theta/2)$ degrees of dwell before the said point on the cam 28 is about to engage the arm 24. Thus the angle between the cams is the sum of these angles, i.e. $(180+\theta)$ degrees, or 180 + half of the total angle through which the arms rotate in moving the film through one frame length.

The relative angular positions of the arms 22 and 24 during one cycle are shown in FIGS. 3 to 6. At the beginning of a cycle the arms are apart and define the angle through which the film is moved during one cycle. As the constant diameter cams 26, 28 rotate they move the arms together in a sweeping movement through the position shown in FIG. 4 into the position shown in FIG. 5. The arms then move apart through the position shown in FIG. 6 back into the angular relationship shown in FIG. 3. The cycle is completed by repeating the angular movements until the FIG. 3 position is again reached.

Reciprocation of the arms 22, 24 into and out of engagement with the film 10 is controlled by cams 38, 44 which are shown in FIGS. 7 and 8 respectively. The small letters of the alphabet in FIGS. 7 and 8 correspond with portions of a cycle which will be described with reference to FIG. 9.

Referring now to FIG. 7, the groove 38 in the cam 40 has an outer portion 131 and an inner portion 132 which are linked by portions $b$ and $e$. When the follower 36 (FIG. 1) is in the outer portion 131, the pins 32, 34 are engaged in the film 10, and when the follower is in the inner portion 138, the pins 32, 34 are disengaged from the film 10. In the portions $b$, $e$ the pins are changing from engagement to disengagement, and from disengagement to engagement respectively.

Reference is next made to FIG. 8 which shows the shape of the grooves 46, 48 which receive the pins 50, 52 respectively on the arms 22, 24. The groove 46 has an outer portion 133 and an inner portion 134 which correspond respectively to engagement and disengagement of the claw 90 in the film 10. Change between engagement and disengagement takes place as the pin 50 passes the portions $a$ and $d$. The groove 48 is similar to the groove 46 and has an outer portion 136 and an inner portion 138 which are linked by portions $c$ and $f$.

Next reference is again made to FIGS. 3 to 6 and to FIG. 9 for a more detailed description of the movement of the mechanism during the cycle. FIG. 9 shows a time cycle and the letters A to F represent periods which correspond to the angular portion denoted by letters $a$ to $f$ in FIGS. 7 and 8. Because the letters $a$ to $f$ are placed about the cam wheel 40 and 44 on an angular basis and the letters A to F are positioned about the cycle on a time basis, the position of the letters $a$ to $f$ relative to each other are not the same as the relative positions of the letters A to F.

In the position shown in FIG. 3, which corresponds with the point G in FIG. 9, the arms 22 and 24 are disengaged and the corresponding cam followers 50, 52 are in the outer portions 133, 136 of their corresponding cam grooves. The arms are thus disengaged from the film 10, but the reciprocating pins 32, 34 are engaged in the film 10 since their corresponding cam follower 36 is engaged in the outer portion 131 of the cam 40. As shown in FIG. 3, the constant diameter cams 26, 28 are beginning to rotate with their dwell faces in contact with the edges of the apertures 94, 96 respectively. During the period A of the movement of the cams 26, 28, the cam wheel 44 moves sufficiently for the cam follower 50 on the arm 22 to move from the outer portion 133 to the inner portion 134 and engage the claw 90 of arm 22 in the film 10. Immediately following the engagement of the claw 90, the follower 36 moves into the inner portion 139 on the cam 40 during the period B to withdraw the pins 32, 34 from the film 10. The stroke faces of the cams 26, 28 then engage the sides of the respective apertures and move the arms 22, 24 into the FIG. 4 position and beyond into the FIG. 5 position where the dwell faces are again in contact with the sides of the apertures. As the cams 26, 28 rotate the cam wheel 44 moves through the portions c, d (FIG. 8) during the periods C and D to consecutively engage the claw 92 in the film 10 and withdraw the claw 90 from the film 10. Next the stroke faces of the cams 26, 28 again begin to move the arms 22, 24 respectively with the claw 92 in contact with the film 10. The arms move through the FIG. 6 position until they again reach the angular positions shown in FIG. 3. The dwell faces of the cams 26, 28 again engage the sides of the apertures in the arms 22, 24 and while they are in contact the follower 36 on the cam 40 moves the pins 32, 34 into contact with the film 10 during the period E. Following E, the follower 52 passes through the portion f (FIG. 8) during the period F and withdraws the claw 92 out of contact with the film 10. The followers 50, 52 remain in their respective outer portions 133, 136 of the cam grooves while the constant diameter cams 26, 28 drive the arms through their angular positions shown in FIGS. 3 to 6 and then back into the FIG. 2 position. During this time the pins 32, 34 remain in contact with the film 10 since the corresponding cam follower 36 is in the outer portion 131 of the cam 40 to hold the film stationary for exposure.

Professional films are usually exposed at the rate of 24 frames per second so that one cycle occupies one twenty-fourth of a second. Since the arms must complete two swinging movements for every exposure, the cams 26, 28 rotate at twice the speed of the cam wheels 40 and 44. For a film speed of 24 frames per second, the constant diameter cams 26, 28 rotate 48 times per second or 2,800 r.p.m. and the wheels 40, 44 rotate at 1,440 r.p.m.

The cycle shown in FIG. 9 and the relative positions of the portions a, b, c, d, e, f (FIGS. 7 and 8) can be varied according to the desired characteristics of the cycle. Also periods such as C, D (FIG. 9) can be made to overlap slightly if required.

The radius of the inner portions of the grooves of the cams are preferably made more nearly equal to the corresponding outer portion to minimize the reciprocating movements of the claw arms and to reduce vibration caused by acceleration forces.

I claim:

1. A film transport mechanism for intermittently advancing a photographic film through a predetermined distance equal to the length of a frame of said film, said mechanism comprising in combination:
   a. first and second movable claw arms for transporting said film in a curved path, each of said claw arms having a claw at an outer end for engagement with sprocket holes in said film;
   b. means adapted to rotate said claw arms about an axis such that said claws move in arcuate paths in a common plane about said axis, and such that said claws move apart and together with said first claw arm substantially 180° out of phase with said second claw arm throughout each cycle of operation;
   c. guide means slidably and rotatably coupled to said claw arms whereby said claw arms are guided to reciprocate radially relative both to said axis and to said means for rotating said claw arms for engaging and disengaging said film; and
   d. means for driving said claw arms radially between an engagement position in which the respective claws are engaged in said sprocket holes and a disengagement position in which the claws are adjacent to and out of contact with the film, said driving means being adapted to move the claws between said engagement and disengagement positions at predetermined intervals related to the angular positions of said claw arms such that as said arms move together said first arm moves said film through substantially one-half of a frame length and as said arms move apart said second arm moves said film through the remainder of said frame length.

2. A film transport mechanism as claimed in claim 1 wherein said claws are reciprocated by said driving means through a radial distance which is small compared with the distance moved by a claw in transporting said film through half of a frame length.

3. A film transport mechanism as claimed in claim 1 wherein each of said claw arms is relatively thin and has an aperture intermediate its length, said aperture having parallel longitudinal sides; and wherein said means for rotating said claw arms comprises: a camshaft, means for driving said camshaft; and a pair of constant diameter cams, each of said cams being positioned in an aperture in one of said claw arms, and each of said cams being attached eccentrically to said common camshaft, said cams having a diameter equal to the distance between said parallel sides such that as said camshaft rotates, said cams drive said arms alternately apart and together about said axis.

4. A film transport mechanism as claimed in claim 1 wherein each of said claw arms has a follower adjacent an inner end of said arm, said arm being coupled to said guide means such that said axis lies between said follower and said outer end of said claw arm; and wherein said means for driving said claw arms radially comprises a cam wheel having a pair of generally concentric profiled grooves for cooperating with said followers to move said arms radially; and means for driving said cam wheel about said axis, said second claw arm being positioned between said first claw arm and said wheel such that said follower on said first claw arm cooperates with the outer cam groove and the follower on the second claw arm cooperates with the inner cam groove.

5. A film transport mechanism as claimed in claim 2 wherein each of said claw arms is relatively thin and has an aperture intermediate its length, said aperture having parallel longitudinal sides; and wherein said means for rotating said claw arms comprises: a camshaft, means for driving said camshaft; and a pair of constant diameter cams, each of said cams being positioned in an aperture in one of said claw arms, and each of said cams being attached eccentrically to said common camshaft, said cams having a diameter equal to the distance between said parallel sides such that as said camshaft rotates, said cams drive said arms alternately apart and together about said axis; and wherein each of said claw arms has a follower adjacent an inner end of said arm, said arm being coupled to said guide means such that said axis lies between said follower and said outer end of said arm; and wherein said means for driving said claw arms radially comprises a cam wheel having a pair of generally concentric profiled grooves for cooperating with said followers to move said arms radially; and means for driving said cam wheel about said axis, said second claw arm being positioned between said first claw arm and said wheel such that said follower on said first claw arm cooperates with the outer cam groove and the follower on the second claw arm cooperates with the inner cam groove.

6. A film transport mechanism as claimed in claim 5 wherein said camshaft rotates at twice the rotational speed of said cam wheel.

7. A film transport mechanism as claimed in claim 5 wherein said cams are identical and the angular displacement about said camshaft of one of said cams relative to the other of said cams is equal to 180° plus the angle through which a claw arm rotates in transporting the film through one-half of a frame length.

8. In a film transport mechanism for use in a motion picture camera or the like, said mechanism having: a pair of claw arms adapted to engage and disengage a film for advancing the film through a predetermined frame length; guide means slidably and rotatably coupled to said claw arms, each of said claw arms being free to move in a plane at right angles to an axis of said guide means such that each of said arm rotates about said axis to move said film along said curved path and each of said arms also reciprocates radially relative to said axis to engage and disengage said film; cam means for imparting angular movement to said arms whereby said film is moved along the curved path; means for reciprocating said arms into and out of engagement with said film at predetermined intervals related to the angular positions of said claw arm such that said film is moved through one-half of one frame length by one arm and then through the second half of the frame length by the other arm; and means for locating said film for a predetermined period during which said film is exposed or projected; the improvement wherein each of said arms includes a cam follower adjacent an inner end of said arm, said arm being coupled to said guide means such that said axis lies between said follower and said outer end of said claw arm; and wherein said means for driving said claw arms radially comprises a cam wheel having a pair of generally concentric profiled grooves for cooperating with said followers to move said arms radially; and means for driving said cam wheel at substantially constant speed about said axis, said second claw arm being positioned between said first claw arm and said wheel such that said follower on said first claw arm cooperates with the outer cam groove and the follower on the second claw arm cooperates with the inner cam groove.

9. A film transport mechanism as claimed in claim 1 which further comprises film location means to locate said film when said film is stationary for exposure or projection; and cam means for driving said film location means between an engagement position in which said location is engaged in the sprocket holes in said film, and a disengagement position in which said location means is clear of said film, said cam means driving said location means at predetermined intervals related to the angular positions of said claw arms.

10. A film transport mechanism as claimed in claim 5 which further comprises film location means to locate said film when said film is stationary for exposure or projection; and cam means for driving said film location means between an engagement position in which said location means is engaged in the sprocket holes in said film, and a disengagement position in which said location means is clear of said film, said cam means driving said location means at predetermined intervals related to the angular positions of said claw arms.

11. A film transport mechanism for intermittently advancing a photographic film through a predetermined frame length, said mechanism comprising in combination:

a. first and second claw arms, each of said claw arms having a claw at an outer end for engaging in sprocket holes in said film to transport said film along a curved path, each of said claw arms being relatively thin and having an aperture intermediate its length, said aperture having parallel longitudinal sides; each of said claw arms also having a follower adjacent an inner end of said arm whereby said arms are driven radially to engage and disengage said film;

b. film location means for locating follower film when said film is stationary for exposure or projection, said film location means comprising: a spindle; a cam wheel having a profiled cam groove, said cam wheel being fixed to said spindle; means for driving said spindle; a pedestal fixed to a stationary part of said mechanism; at least one pin reciprocally coupled to said pedestal at an outer end of said location means; a retractable cam follower adjacent the inner end of said location means said cam follower being adapted to cooperate with said profiled cam groove to move said pins between an engagement position in which said pins are engaged in said sprocket holes and a disengagement position in which said pins are clear of said film, said cam follower being adapted to be disengaged from said cam wheel such that said pins can be withdrawn from said film when a film is to be entered into said mechanism;

c. guide means rotatably mounted on said spindle, said guide means being slidably coupled to said claw arms between said apertures and said inner ends of said claw arms such that said claws move in a common plane about the axis of said spindle, said claw arms being free to rotate about said axis for moving said film along said curved path, and said arms being free to reciprocate radially relative to said axis for engaging and disengaging said film;

d. means for rotating said claw arms about the axis of said spindle such that said claw arms move apart and together with said first claw arm substantially 180° out of phase with said second claw arm said means for rotating said claw arms comprising: a camshaft, means for driving said camshaft; and a pair of constant diameter cams, each of said cams being positioned in an aperture in one of said claw arms, and each of said cams being attached eccentrically to said camshaft, said cams having a diameter equal to the distance between said parallel sides such that as said camshaft rotates said cam drive said arms alternately apart and together about said axis;

e. means for driving said claw arms radially to engage and disengage said film at predetermined intervals related to the angular positions of said claw arms such that as said arms move together said first arm moves said film through substantially one-half of a frame length, and as said arms move apart said second arm moves said film through the remainder of said frame length, said means for driving said claw arms comprising: a second cam wheel having a pair of generally concentric profiled grooves for cooperating with said claw arm followers to move said arms radially, said second cam wheel being fixed to said spindle so that said spindle drives both first and second cam wheels about said axis, said second claw arm being positioned between said first claw arm and said second cam wheel such that said follower on said first claw arm cooperates with the outer cam groove and the follower on the second claw arm cooperates with the inner cam groove.

12. A film transport mechanism as claimed in claim 11 wherein said camshaft rotates at twice the rotational speed of said spindle.

13. A film transport mechanism as claimed in claim 12 wherein said cams are identical and the angular displacement about said camshaft of one of said cams relative to the other of said cams is equal to 180° plus the angle through which a claw arm rotates in transporting the film through one-half of a frame length.

* * * * *